United States Patent [19]

Smock

[11] 4,380,287

[45] Apr. 19, 1983

[54] OSCILLATING-ACCUMULATING CONVEYOR SYSTEM

[76] Inventor: William L. Smock, 5831 S. Meridian St., Indianapolis, Ind. 46217

[21] Appl. No.: 213,796

[22] Filed: Dec. 8, 1980

[51] Int. Cl.³ .......................................... B65G 37/00
[52] U.S. Cl. ................................... 198/648; 198/772; 104/135; 104/162
[58] Field of Search ............. 198/472, 648, 750, 747, 198/772; 104/135, 162, 172 S

[56] References Cited

U.S. PATENT DOCUMENTS

| | | | |
|---|---|---|---|
| 2,820,542 | 1/1958 | Oswald | 198/218 |
| 2,901,096 | 8/1959 | Burrows | 198/772 |
| 3,055,313 | 9/1962 | Stoll et al. | 198/750 |
| 3,486,609 | 12/1969 | Rogers | 198/218 |
| 3,642,158 | 2/1972 | Koennecke et al. | 198/472 |
| 4,037,714 | 7/1977 | Koepke | 198/750 |
| 4,079,832 | 3/1978 | Gallei | 198/747 |
| 4,282,970 | 8/1981 | Smock | 198/772 |

FOREIGN PATENT DOCUMENTS

| | | | |
|---|---|---|---|
| 120705 | 1/1948 | Sweden | 198/750 |
| 318529 | 1/1972 | U.S.S.R. | 198/750 |
| 398470 | of 0000 | U.S.S.R. | |

*Primary Examiner*—Joseph E. Valenza
*Attorney, Agent, or Firm*—Flynn, Thiel, Boutell & Tanis

[57] ABSTRACT

An elongated oscillating live-roller conveyor is disposed between a pair of horizontal guide rails which project upwardly above the conveyor rollers for slidably guiding skids unidirectionally along the conveyor. A pair of one-way holding mechanisms are mounted on opposite sides of the skid and cooperate with the upper surfaces of the guide rails for causing the skid to be unidirectionally stepped along the conveyor as it reciprocates back and forth. The one-way holding mechanism includes an elongated dog which is swingably mounted on the side of the skid and has a lower edge which slides along the top surface of the guide rail during forward advance of the skid, and grippingly engages the top surface during retraction of the conveyor so as to prevent retraction of the skid.

17 Claims, 5 Drawing Figures

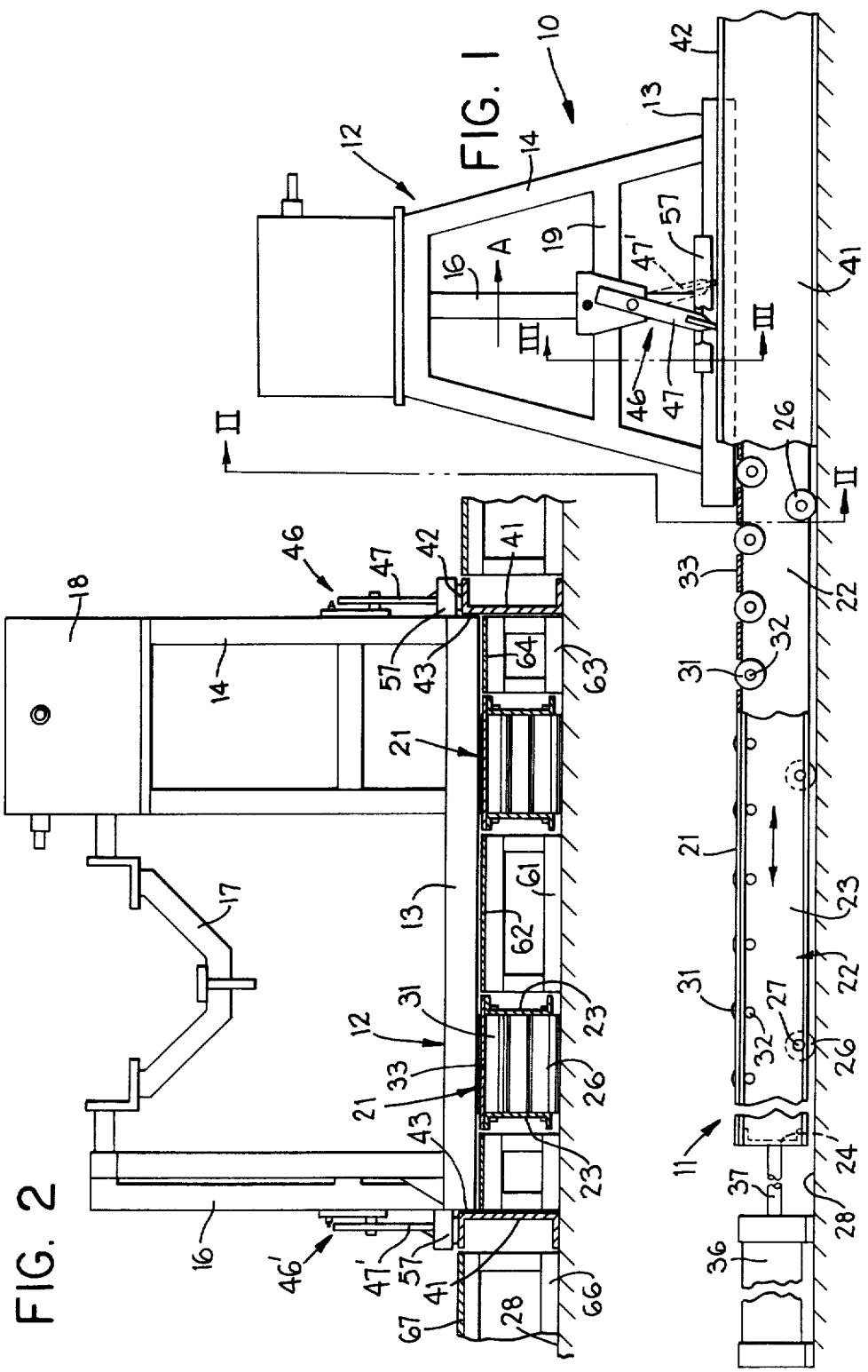

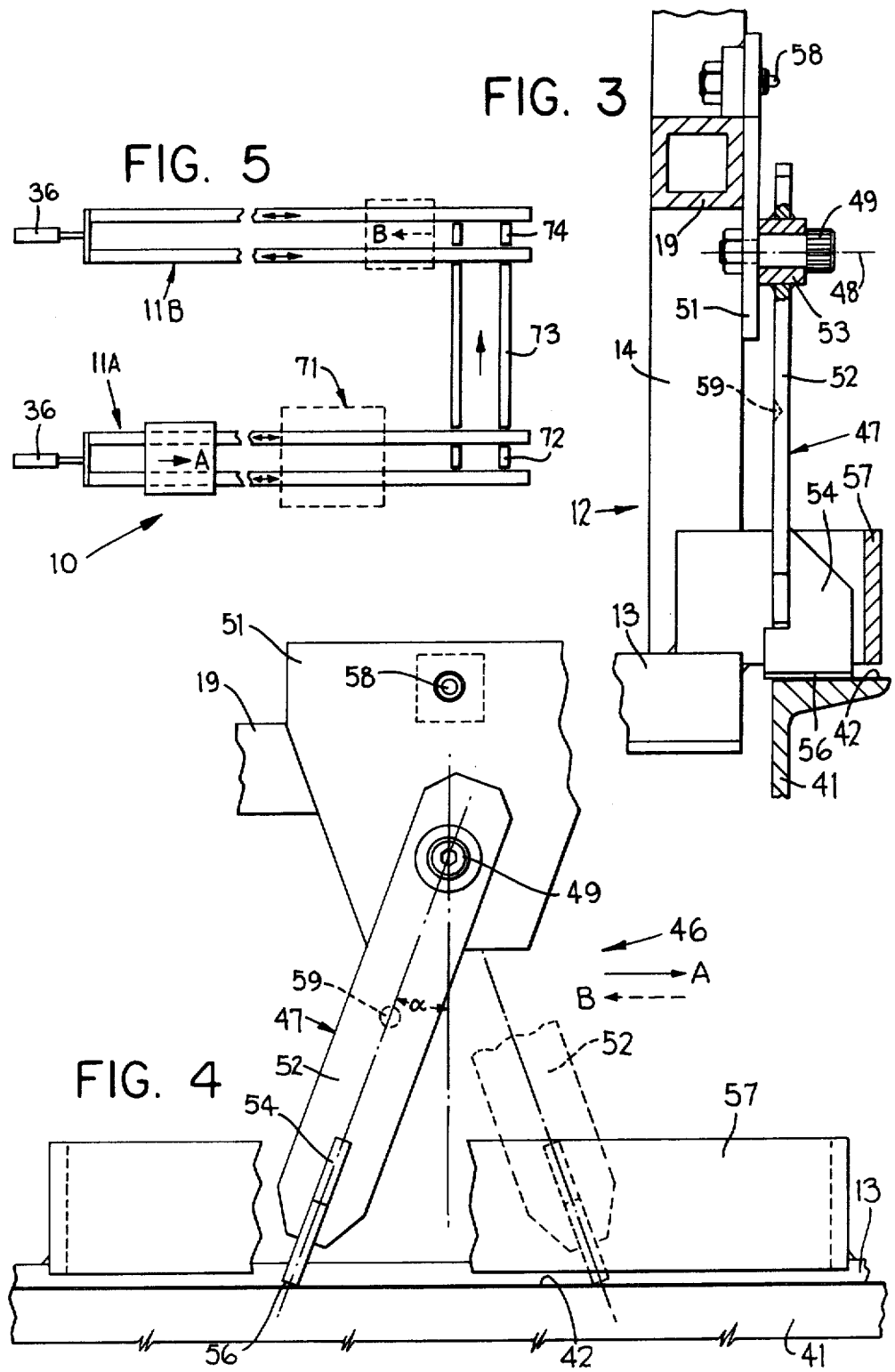

OSCILLATING-ACCUMULATING CONVEYOR SYSTEM

FIELD OF THE INVENTION

This invention relates to a conveyor system incorporating a reciprocating live-roller conveyor and, in particular, to an improved conveyor system designed for conveying and/or accumulating pallets or skids, which conveyor system incorporates guide rails for guiding the movement of the skids and one-way holding mechanisms coacting between the skids and guide rails for permitting the skids to be unidirectionally moved in a steplike manner during the reciprocating movement of the conveyor.

BACKGROUND OF THE INVENTION

Many production and manufacturing operations use an assembly-line process wherein the product or article is sequentially moved in a steplike manner between adjacent working stations. These assembly-line processes utilize various types of conveyor systems for accomplishing the intermittent steplike movement of the product. While many different types of conveyor systems are commonly utilized, such as powered accumulating-type roller conveyors, chain conveyors and the like, nevertheless many of the conventionally utilized conveyor systems possess various disadvantages when considered for use under some assembly-line conditions. For example, many of the known conveyor systems are structurally and operationally complex, and hence expensive to purchase and maintain. Other conveyor systems are undesirable as to their space requirements, such as by requiring a large structural frame so that the conveyor bed is hence at an undesirably high elevation, or requiring either overhead or below-floor level supports which thus make initial installation and assembly of the conveyor extremely difficult and at the same time prevent efficient movement and/or modification of the conveyor system.

To improve upon the conveyor systems presently being utilized, specifically the complex powered accumulating-type roller conveyors which utilize complex drive mechanisms and elaborate controls and stop mechanisms to provide various zones, there has been developed an accumulating-type conveyor commonly referred to as an oscillating or reciprocating live-roller conveyor. In this type conveyor, the conveyor rolls for supporting the products are freely rotatably supported on a horizontally elongated frame, the latter being rollingly supported on a support floor or surface. A reciprocating drive, such as a fluid pressure cylinder, causes the conveyor to reciprocate or oscillate back and forth through a limited linear stroke. An elongated stationary frame extends longitudinally of the conveyor and mounts thereon movable dogs, normally weight- or spring-urged into the path of movement of the products. During the forward advance of the conveyor, the products are moved forwardly and pass by the dogs, which dogs engage and hold the products during the retraction of the conveyor. In this manner, the products are moved forwardly in an intermittent steplike manner. Conveyor systems of this type have proven desirable in that they permit a product or load to be advanced in a simple manner, and in fact the products can be readily accumulated in an abutting relationship with one another while at the same time the driving force between the live conveyor rolls and the products is extremely small so that the line pressure developed between and along the accumulated products can thus be maintained at an extremely small magnitude. Examples of conveyor systems of this type are U.S. Pat. No. 4,037,714 (Koepke), U.S. Pat. No. 2,820,542 (Oswald) and U.S.S.R. Pat. No. 398 470.

While these oscillating live-roller conveyor systems do possess an advantageous mode of operation, nevertheless these known conveyor systems, such as illustrated by the above-identified patents, possessed structural and operational features which have severely limited their use and adaptation, or restricted their ease and/or flexibility of use. For example, these known conveyor systems have permitted products or loads to be moved therealong solely in a single direction, which directionalization of the complex and extensive conveyor system thus severely hampers and often prevents maximum utilization of the conveyor system when conveying of articles therealong in the opposite direction is desired. A directional reversal in these known conveyors can be accomplished (if at all) only by disassembling and reassembling the conveyors so as to be oppositely directed. This is obviously an extremely laborious and time-consuming task, and in many installations such reassembling of the conveyor so as to change the directionalization of same is not possible.

Another disadvantage with these known oscillating live-roller conveyors is the difficulty in causing the conveyed loads to be temporarily stopped at a desired location, such as at a work station, to permit the desired assembly or other operational steps to be carried out on the conveyed products. At the present time, this stoppage of loads can normally be accomplished only by providing a separate power-activated stop mechanism which an operator manually controls for stopping the selected load to permit the desired work steps to be carried out. Thus, these known oscillating live-roller conveyor systems have possessed disadvantages which have greatly restricted their flexibility and adaptability of use in many assembly-line production processes.

Still another common disadvantage of these known conveyor systems is their inability to efficiently utilize the maximum forward stroke of the conveyor, that is, their inability to maximize the forward steplike advance of the load. Since the conveyor is reciprocated forwardly through a preselected stroke, most of these conveyors have the dogs spaced at intervals which are slightly less than the conveyor stroke so as to insure that the load fully passes by the dog, which in turn normally permits a slight rearward movement of the load prior to its engaging the dog, and hence maximum conveying efficiency of the conveyor is not achieved.

Accordingly, the present invention relates to an improved oscillating accumulating-type live-roller conveyor system which overcomes the above-mentioned disadvantages as associated with known conveyors of this type. For example, the improved oscillating live-roller conveyor system of this invention utilizes swingable dogs or paddles which can be easily rotated so as to be directed in either direction, whereupon the directionalization of the conveyor system can be readily reversed in a simple and time-saving manner without requiring any structural rebuilding or reassembly of the conveyor system. Further, These dogs or paddles are preferably swingably mounted on the loads, such as skids or pallets, whereby maximum conveying efficiency is achieved inasmuch as the skid will hence move throughout the full forward stroke of the conveyor inasmuch as the dog travels along with the skid, thereby preventing any rearward movement of the skid during retraction of the conveyor. In fact, the conveyor system of this invention has been observed to result in the skid travelling through a stepwise distance which exceeds the conveyor stroke inasmuch as this arrangement enables the momentum of the skid to be utilized so as to maximize the steplike forward advance. In addition, the dogs or paddles are provided in cooperating pairs which are spaced sidewardly of the conveyor, such as by being positioned on opposite sides of the skid, whereupon when accumulating or stoppage of skids is desired, one of the dogs adjacent one side of the conveyor can be manually rotated so as to point in the upstream direction, with the other dog remaining in its downstream direction, whereupon the load can thus be maintained stationary even as the conveyor oscillates back and forth. Accumulating or stopping of loads can thus be carried out in a very simple and time-saving manner at any random location along the conveyor without requiring any additional stop mechanisms or controls.

In a preferred embodiment of the conveyor system according to this invention, a pair of elongated oscillating live-roller conveyor sections are disposed in side-by-side parallel relationship between a pair of horizontal guide rails, which guide rails project upwardly a slight distance above the roller surface of the conveyor rollers, whereby pallets or skids as conveyed along the conveyor sections are slidably guided unidirectionally along the conveyor between the guide rails. A pair of one-way holding mechanisms are mounted on opposite sides of the skid and cooperate with the upper surfaces of the guide rails for causing the skid to be unidirectionally stepped along the conveyor system as the conveyor sections reciprocate back and forth. The one-way holding mechanism includes an elongated dog or paddle which is swingably mounted on the side of the skid and has a lower edge which slides along the top surface of the guide rail during forward advance of the skid, and grippingly engages the top surface of the guide rail during retraction of the conveyor so as to prevent retraction of the skid. The paddle is urged, by its own weight, downwardly toward a pendant position, which causes the lower edge to engage the guide rail, with the paddle being maintained at a slight angle relative to the vertical so that the paddle is thus directed rearwardly of the conveyor. The paddles as mounted on opposite sides of the skid can be readily manually swung through the better part of a full revolution so that the paddles can be reversely directed relative to the longitudinal direction of the conveyor, whereupon the skids can be readily unidirectionally stepped along the conveyor in the opposite direction is desired. In addition, if stopping or accumulating of the skid is desired, then the paddle adjacent only one side of the conveyor is manually swung so as to be directed upstream, with the paddle on the other side of the skid remaining in a downstream direction, thereby holding the skid stationary even though the conveyor sections continue to oscillate back and forth. The skid is preferably provided with a shroud which is positioned directly adjacent and overlaps the top surface of the guide rail in surrounding relationship to the lower edge of the paddle to prevent an operator's foot from being accidentally trapped between the paddle and the guide rail.

Other objects and purposes of the invention will be apparent to persons familiar with systems of this general type upon reading the following specification and inspecting the accompanying drawings.

BRIEF DESCRIPTION OF THE DRAWINGS

FIG. 1 is a fragmentary side elevational view of a preferred embodiment of a conveying system according to the present invention, with parts of the guide rails and conveyor being broken away for clarity of illustration.

FIG. 2 is a fragmentary sectional elevational view taken substantially along line II—II in FIG. 1.

FIG. 3 is an enlarged fragmentary view, partially in cross section, taken substantially along line III—III in FIG. 1.

FIG. 4 is an elevational view taken from the right side of FIG. 3.

FIG. 5 is a diagrammatic plan view of a proposed assembly-line process employing the conveyor system of this invention.

Certain terminology will be used in the following description for convenience in reference only, and will not be limiting. For example, the words "upwardly", "downwardly", "rightwardly" and "leftwardly" will refer to directions in the drawings to which reference is made. The word "forwardly" will refer to the normal direction of movement of articles along the conveyor, which direction is rightwardly in FIG. 1, and "rearwardly" will refer to the opposite direction. The words "inwardly" and "outwardly" will refer to directions toward and away from, respectively, the geometric center of the conveyor system and designated parts thereof. Said terminology will include the words specifically mentioned, derivatives thereof, and words of similar import.

DETAILED DESCRIPTION

FIG. 1 illustrates therein a conveyor system 10 according to the present invention. This system includes an oscillating live-roller conveyor 11 coacting with skids or pallets 12 for causing the latter to be intermittently stepped unidirectionally along the conveyor in the longitudinal direction thereof.

The skid 12, as illustrated by FIGS. 1 and 2, includes a substantially rectangular base or floor 13 from which project uprights 14 and 16 adjacent the opposite sides thereof. A cradle 17 extends transversely across the skid for joining the upper ends of the uprights, and a gear box 18 is provided adjacent one end of the cradle. The skid 12, as described, is a substantially conventional structure designed specifically for supporting and transporting transmissions, although it will be appreciated that the skid can assume many other shapes and configurations without departing from the present invention.

Still referring to FIGS. 1 and 2, the oscillating conveyor 11 includes a pair of horizontally elongated conveyor sections 21 which are identical and are disposed so as to extend in parallel relationship with one another, the two sections being sidewardly spaced apart. The conveyor section 21 includes a horizontally elongated low-profile frame 22 formed by a pair of horizontally elongated parallel side rails 23 which are rigidly joined together by several transversely extending connecting members, one of which is illustrated at 24 in FIG. 1. The side rails 23 are, in the illustrated embodiment, conventional channel members, although they can obviously have any other desired configuration.

The frame 22 mounts thereon a plurality of bottom rollers 26, hereinafter referred to as wheels. These wheels are spaced at uniform and selected intervals in the longitudinal direction of the frame, and are individually rotatably supported by axles 27 which extend perpendicularly between and are supported on the opposite side rails. These wheels 26 are positioned so that the lowermost point thereon, specifically the wheel periphery or tread, projects slightly below the lowermost surface of the frame 22 so that the wheels thus rollingly engage a suitable support surface 28, such as a floor.

The conveyor section 21 also includes a plurality of conveyor rolls 31, normally referred to as live-rollers. These rolls 31 are uniformly spaced apart in parallel relationship throughout the longitudinal direction of the conveyor section, and each conveyor roll 31 is individually rotatably supported on an axle 32 which extends perpendicularly between and is supported on the side rails 23. The conveyor rolls 31 are normally supported on their respective axles by conventional bearings (not shown), the rolls thus being individually freely rotatable about horizontal rotational axes which extend perpendicular to the horizontal direction of movement of the conveyed skids 12.

The uppermost peripheral area of the conveyor rolls 31, namely the line of contact of engagement between the roll 31 and the bottom surface of the skid base 12, is disposed slightly above the upper surface of the side rails 23 so as to maintain the skid spaced above the side rails, while at the same time maintaining the conveyor section of minimal vertical profile. In a preferred embodiment, the conveyor section 21 is preferably provided with a cover plate 33 extending thereover, which cover plate is provided with suitable rectangular openings for permitting the upper portion of the respective conveyor rolls 31 to project upwardly therethrough, in which case the uppermost periphery of the conveyor roll is thus disposed slightly above the upper surface of the cover plate 33. This cover plate 33 is preferably formed from conventional dimple plate, that is, a plate having a plurality of upwardly-projecting dimples or projections thereon, thereby providing a support surface which will permit a workman to stand thereon in the regions between the upwardly-projecting conveyor rolls.

The conveyor section 21 is horizontally reciprocated with a linear back-and-forth movement by means of any suitable drive device, which in the illustrated embodiment comprises a conventional fluid pressure cylinder 36. The cylinder 36 is mounted with its housing stationarily disposed relative to the support surface 28, and the piston rod 37 of the cylinder 36 is suitably joined to the frame 22, as by being joined to one of the transverse connecting members 24. The cylinder 36, which may be either pneumatic or hydraulic, can be of the double-acting type so that pressure fluid is alternately supplied to opposite sides of the cylinder piston, thereby causing reciprocating movement of the piston rod and of the conveying section 21 coupled thereto. The cylinder 36 can be coupled to the conveyor section 11 at any location therealong or, if desired, the conveyor section can be connected to a pair of opposed cylinders for respectively causing the advancing and retracting movement of the conveyor section. Further, the two conveyor sections 21 are preferably rigidly joined together so as to permit their simultaneous actuation by the single cylinder 36, although it will be appreciated that a separate cylinder could be connected to each conveyor section, although in this latter situation appropriate flow controls would have to be provided for causing simultaneous actuation of the cylinders associated with the two conveyor sections.

To properly guide the skids 12 as they are advanced along the conveyor 11, the latter is provided with a pair of horizontally elongated guide rails 41 which extend in parallel relationship with one another and in parallel relationship with the longitudinal direction of the conveyor. These guide rails 41 are sidewardly spaced apart so as to have the two conveyor sections 21 positioned therebetween. The guide rails 41 are, in the illustrated embodiment, formed as channel members which are disposed so as to open sidewardly in opposite directions. These guide rails 41 have the upper surfaces 42 thereof disposed so as to define a substantially horizontal plane which is disposed at an elevation which is above the horizontal plane defined by the uppermost points on the conveyor rolls 31, whereby the base wall of each guide rail 41 thus defines an inner slide surface 43. The slide surfaces 43 defined by the guide rails 41 face one another and are sidewardly spaced apart by a distance which is slightly greater than the horizontal width of the skid base 13, whereby these surfaces 43 thus closely confine the skid base therebetween and slidably guide same as the skid is movably displaced along the conveyor.

To insure that the skids 12 are moved unidirectionally along the conveyor 11, the conveyor system 10 also includes one-way holding assemblies 46 coacting between the conveyor 11 and the skids 12. As illustrated by the preferred embodiment, this one-way holding assembly 46 is mounted on the skid 12 and is designed to cooperate with, and hence react against, the guide rail 41 as explained hereinafter.

The one-way holding assembly 46 is mounted on the skid adjacent one side thereof, as by being mounted on the upright 14, whereby the holding assembly is thus adapted for cooperation with the adjacent side rail 41 (the rightward side rail in FIG. 2). This one-way holding assembly 46, as illustrated most clearly in FIGS. 3 and 4, includes a paddle or dog 47 which is supported for free swinging movement about a substantially horizontal axis 48, the latter extending approximately parallel with the rotational axes of the conveyor rolls 31. This axis 48 is defined by a fastener or bolt 49 which mounts the paddle 47 on a mounting plate 51, the latter being of any desired configuration and being suitably fixed by fasteners or by welding to a portion of the upright 14, such as by being fixed to a cross piece 19 associated with the upright 14. The paddle 47 includes a platelike arm 52 having a hub 53 fixed thereto adjacent the upper end thereof, which hub rotatably surrounds the fastener 49. The lower end of arm 52 has a transversely extending blade 54 fixed thereto, which blade is also of a platelike structure and terminates in a lower edge 56 which is adapted to slide along or grippingly engage the upper surface 42 of the respective side rail 41. This lower edge 56 extends substantially perpendicularly relative to the longitudinal direction of the side rail 41.

The radial length of paddle 47, as measured radially from the axis 48 to the lower edge 56, is substantially greater than the vertical dimension or spacing between the axis 48 and the surface 42. Thus, since the weight of the paddle 47 continuously urges it to swing downwardly toward a pendent position, the paddle will always assume a position wherein the lower edge 56 is engaged with the upper rail surface 42, so that the paddle 47 is thus inclined at a small angle α relative to a vertical plane passing through the axis 48. This angle is, in the illustrated embodiment, preferably approximately 20°, although it will be appreciated that this angle can vary through a reasonable range, such as from approximately 12° to approximately 30°.

In addition to the one-way holding mechanism 46 disposed adjacent one side of the skid 12, a further such holding mechanism is also mounted on the skid adjacent the other side thereof, this other holding mechanism being substantially identical to the mechanism 46 and hence designated 46' in FIG. 1. This other holding mechanism 46' is supported on the other upright 16 so that the paddle 47' coacts with the other side rail 41 (the leftward side rail in FIG. 1), and the paddle 47' is pivotally supported about an axis which is substantially aligned with the axis 48 associated with the holding assembly 46.

To provide a protective shield around the lower edge of the paddles 47 and 47', each side edge of the skid base 13 is provided with a substantially U-shaped shield or shroud 57 fixedly secured thereto, which shroud 57 projects sidewardly from the base and over the upper rail surface 42 so as to create a protective wall, specifically a foot guard, around the lower portion of the paddle to prevent a workman from accidentally positioning his foot between the paddle and the upper rail surface. This shroud 57 is sufficiently elongated so as to enable each paddle 47 and 47' to be manually swingably displaced upwardly about its axis (clockwise in FIG. 4) from the solid line to the dotted line position illustrated in FIG. 4, and vice versa.

To facilitate access to the loaded skids associated with the conveyor system, and at the same time optimize safety of the workers, the conveyor system 10 of the present invention is preferably provided with a built-up floor arrangement so as to minimize elevational changes in the vicinity of the conveyor system. For example, as illustrated in FIG. 2, the region between the conveyor sections 21 is preferably occupied by a framework 61 which has a horizontal cover plate 62 disposed thereon, the latter being substantially horizontally coplanar with the uppermost surface defined by the adjacent frames 22. Further frameworks 63 are positioned between each conveyor section 21 and the adjacent side rail 41, these latter frameworks 63 also having horizontal cover plates 64 which are effectively horizontally coplanar with the cover plate 62. Similar frameworks 66 can be provided adjacent but exterior of the side rails 41, these latter frameworks having cover plates 67 which are substantially horizontally coplanar with the upper rail surfaces 42. All of these cover plates are preferably constructed from conventional dimple plate similar to that used for the cover plate 33, as previously described.

In addition, in some circumstances it is desirable to secure elongated strips of such dimple plate to the upper flange of each side rail 41, whereupon the upper surface of this dimple plate thus defines the upper rail surface 42. The use of this dimple plate hence results in upwardly-projecting dimples which create a positive obstacle for preventing the lower edge 56 of the paddles from sliding rearwardly along the side rails.

OPERATION

The operation of the conveyor system 10 according to this invention will be briefly described to insure a complete understanding thereof.

The load to be conveyed along the conveyor, such as the skid 12, is deposited on the inlet end (the leftward end in FIG. 1) of the conveyor 11, as by a forklift or other transfer apparatus. The skid 12 is supported by the conveyor rolls 31 rollingly engaging the lower surface of the skid base 13, which base has a width slightly less than the space between the inner surfaces 43 of the guide rails so that the skid is closely but slidably confined therebetween. With the skid 12 positioned on the conveyor 11, the paddles 47 and 47' are positioned so that the blades thereof are directed rearwardly relative to the desired conveying direction.

To initiate the conveying movement, the power cylinder 36 is energized so that the conveyor sections 21 are linearly moved forwardly (rightwardly in FIG. 1) through a preselected stroke. During this rightward or advancing movement, the complete frame 22 is linearly moved forwardly due to the wheels 26 being rollingly engaged with the support surface 28. The skid 12 remains stationarily supported on the conveyor rolls 31, which rolls themselves remain substantially nonrotatable, so that the skid 12 is advanced (in the direction of arrow A) through a distance equal to the forward or advancing stroke of the conveyor. During this advancing movement, the lower edges 56 of the paddles 47–47' slide along the upper rail surfaces 42.

After the completion of the advancing stroke, the cylinder 36 is reversely energized so as to retract or move the conveyor sections 21 rearwardly (leftwardly in FIG. 1) back to their original position, thereby completing one cycle of operation. As the conveyor sections 21 are retracted, the frames 22 are moved backward due to the wheels 26 rolling on the support surface 28. As the conveyor sections move backwards, the skid 12 is prevented from moving backwards due to the lower edges 56 of the paddles 47–47' gripping or biting into the stationary upper rail surfaces 42, which rails 41 thus act as a reaction structure, whereupon the conveyor rolls freely rotate beneath the lower surface of the skid base 13 so as to enable the conveyor sections 21 to be returned to their original position. In this manner, the skid 12 is thus unidirectionally advanced through a step distance equal to the stroke of the conveyor and, due to the cyclic back-and-forth reciprocating movement of the conveyor sections, the skid 12 is hence unidirectionally moved forwardly (rightwardly in FIG. 1) along the conveyor in an intermittent steplike manner. Not only does this arrangement enable full utilization of the conveyor stroke for advancing the skid, but in fact it has been observed that the actual advancing movement of the skid normally exceeds the conveyor stroke inasmuch as the momentum of the skid causes it to continue to move forwardly through an additional distance even after the movement of the conveyor is reversed, so that this system hence effectively results in a slight increase or multiplication of the conveyor stroke so as to thereby result in optimum and efficient advancing of the skid unidirectionally along the conveyor.

In the event that several skids accumulate in series along the conveyor and effectively abuttingly engage one another so as to restrict or prevent forward advancing of the skids, then the conveyor system of this invention readily permits such accumulation without interfering with the normal back-and-forth reciprocation of the conveyor 11. Since only a minimal pushing forth is imposed by the conveyor onto the skid 12, due to the provision of the freely rotatable conveyor rolls 31, the conveyor 11 can continue to reciprocate back and forth even though the skids 12 are maintained stationary at all times, and prevented from advancing, without imposing any excessive line pressure on and throughout the abutted skids.

With the improved conveyor system according to this invention, any selected skid 12 can be easily stopped at any desired location, such as a selected work station, so as to permit any desired manufacturing or assembly operation to be carried out with respect to the object being carried on the skid. This can be accomplished by a workman manually swinging (clockwise in FIG. 4) one of the paddles 47 or 47' around so that it is pointing in the forward or conveying direction, whereupon one of the paddles will thus assume the dotted line position shown in FIG. 1 or FIG. 4. With one of the paddles thus being directed rearwardly, and the other paddle being directed forwardly, these two paddles will thus both be engaged with their respective upper rail surfaces 42 and hence will thus effectively maintain the respective skid 12 stationary, and will prevent it from moving either forwardly or rearwardly, even though the conveyor sections 21 continue to reciprocate back and forth therebeneath. Once the workman has completed his desired task, then the forwardly-projecting paddle can again be manually swung (counterclockwise) back to its rearwardly-directed orientation, whereupon the two paddles will again be aligned and will again permit the skid to be unidirectionally stepped forwardly in the direction of arrow A during the back-and-forth reciprocation of the conveyor sections. This stoppage of the skid can hence be accomplished in a very simple manner without requiring any additional or elaborate machinery for this purpose, and without requiring any structural modification of the skid. Additionally, this arrangement is highly advantageous since it enables the skid to be stopped and maintained stationary relative to the oscillating conveyor at any random location along the conveyor.

In addition, in some manufacturing operation it is desirable to initially move the skids in one direction along a conveyor for carrying out certain processes, and then move the skids in the opposite direction along the same or another conveyor for carrying out additional operations. This can be easily accomplished with the conveyor system of this invention without requiring any major structural changes or without requiring handling or turning of the skids. For example, if the skids are initially unidirectionally stepped forwardly along the conveyor in a rightward direction, as indicated by the solid arrow A in FIGS. 1 and 4, then this is achieved by positioning both paddles 47–47' so that they point rearwardly as indicated by solid lines in these Figures. However, if it subsequently becomes desirable to move the skid 12 unidirectionally in the opposite direction, namely leftwardly in FIGS. 1 and 4 as indicated by the dotted arrow B in FIG. 4, then this can be easily accomplished by manually swingably rotating (clockwise in FIGS. 1 and 4) both of the paddles 47–47' through substantially a complete revolution until the paddles are oppositely directed, such as indicated by the dotted line positions shown in FIGS. 1 and 4, at which time the continued back-and-forth reciprocation of the conveyor sections will now cause the skid 12 to be unidirectionally stepped leftwardly along the conveyor in the direction indicated by arrow B. This desirable directional change is easily accomplished without requiring any modification in the structure or controls of the conveyor, and without requiring any structural modification of the skids, other than the simple manual swinging of the paddles into their opposite positions. This capability is also significant in situations where the skids are symmetrical since, if for some reason the skid becomes rotated 180° during handling and is thus deposited on the conveyor in a reverse orientation, then the skid can nevertheless be successfully advanced along the conveyor merely by swinging the paddles into a rearwardly-directed position.

FIG. 5 diagrammatically illustrates a plan view of a conveyor system, and illustrates the flexibility of the improved conveyor system. The system shown in FIG. 5 includes two parallel conveyors according to the present invention, which conveyors are designated 11A and 11B for purposes of distinction. If a load or skid 12 is positioned on the inlet end of conveyor 11A, it can be unidirectionally advanced rightwardly therealong until reaching a selected work station 71, at which time one of the two paddles on the skid is rotated into a forward direction, thereby enabling the skid to remain stationary art the station 71 until the selected work steps have been carried out, even though the conveyor 11A continues to reciprocate. Thereafter the forwardly-directed paddle is swung back into its rearwardly-directed position, and the skid 12 again unidirectionally is stepped forwardly to the end of the conveyor, at which time it is engaged by a conventional roller transfer 72 which slightly lifts the skid upwardly out of engagement with the conveyor 11A, whereupon a workman can then manually push the skid from the transfer 72 along a conventional live-roller or skate wheel conveyor 73 onto another conventional roller transfer 74, which transfer is then lowered so as to deposit the skid 12 on the rightward end of the other conveyor 11B. the workman then manually swings both of the paddles into their opposite positions so that they are now pointed rearwardly (rightwardly in FIG. 5) relative to the conveyor 11B, whereupon the reciprocation of this conveyor 11B will now cause the skid 12 to be unidirectionally stepped forwardly (leftwardly) along the conveyor 11B for further handling of the skid as desired. This thus illustrates the flexibility and versatility of the improved conveyor system, and particularly the flexibility achieved by mounting a pair of swingable one-way paddles or dogs on each skid.

The paddle 47 can be provided with a recess 59 which coacts with a spring-urged detent pin 58 for holding the paddle in a raised inactive position.

It will be appreciated that the structure and/or configuration of paddles 47 may be changed significantly without departing from the present invention.

While the preferred embodiment discloses the paddles being engageable with surfaces defined along the upper edges of the guide rails, it will be appreciated that while this is a preferred structure in that it minimizes the overall structural complexities of the system and permits maintaining of an overall low profile, nevertheless the paddles could cooperate with elongated surfaces defined on other stationary structural elements which extend longitudinally of the conveyor, which other elements could be separate from the guide rails and positioned sidewardly or vertically displaced relative to the guide rails.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a conveyor system including a horizontally elongated conveyor unit having a plurality of parallel spaced-apart freely-rotatable conveyor rolls, driving means for cyclically reciprocating the conveyor unit back and forth in the elongated direction thereof through a predetermined stroke, and a skid adapted to be conveyed by said conveyor unit, said skid including a base rollingly supported on said conveyor rolls, the improvement comprising:

elongated stationary reaction means positioned adjacent said conveyor unit and extending longitudinally therealong;

one-way holding means mounted on said skid and coacting with said reaction means for permitting said skid to be moved forwardly during the forward stroke of said conveyor unit while preventing rearward movement of the skid during the rearward stroke of said conveyor unit, whereby the skid is intermittently advanced in a steplike manner along the conveyor unit due to the cyclic reciprocation thereof; and means mounting said one-way holding means on said skid for permitting said holding means to be selectively moved between first and second positions relative to said skid when the latter is supported on said conveyor unit, said holding means when in said first position coacting with said reaction means for causing the skid to be unidirectionally stepped in one direction along the conveyor unit in response to the cyclic reciprocation thereof, and said holding means when in said second position coacting with said reaction means for causing the skid to be unidirectionally stepped in the opposite direction along the conveyor unit in response to the cyclic reciprocation thereof.

2. A conveyor system according to claim 1, wherein said reaction means defines thereon an elongated and substantially continuous surface, said mounting means defining pivot means, and said holding means comprising an elongated arm swingably supported on said pivot means and having a free end portion which is urged into engagement with said surface, said arm being swingably movable about said pivot means through an angle which exceeds 180° but is less than 360° for permitting the arm to be selectively moved between said first and second positions.

3. A conveyor system according to claim 1, wherein said elongated stationary reaction means comprises an elongated and substantially continuous rail extending longitudinally along said conveyor unit, said rail defining thereon an upwardly-directed reaction surface which extends longitudinally along said rail, said mounting means comprising pivot means mounted on said skid at a location disposed upwardly relative to said reaction surface, said pivot means defining a pivot axis which lies within a plane which extends substantially perpendicular with respect to the longitudinal direction of said conveyor unit, and said holding means comprising an elongated paddlelike arm which adjacent the upper end thereof is swingably supported on said pivot means so that the arm is suspended downwardly from the pivot means, said arm having a length as measured from its lower end to said pivot axis which is greater than the vertical spacing between said pivot axis and said reaction surface so that the lower end of said arm engages said reaction surface while maintaining said arm in angled relationship relative to said perpendicular plane, whereby said arm when viewed from said pivot axis is angled in the upstream direction relative to the advancing direction of the skid, said arm being swingable away from said reaction surface through an angle which approaches but is less than one complete revolution so as to cause the lower end of said arm to engage the reaction surface on the other side of said perpendicular plane for defining the aforementioned first and second positions.

4. A conveyor system according to claim 3, wherein said holding means includes two said arms swingably mounted on said skid in spaced-apart relation and disposed for engagement with said reaction means, both of said arms being swingably movable between said first and second positions for permitting the advancing direction of the skid to be selectively reversed relative to the elongated direction of the conveyor unit, and one of said arms being selectively swingable into said second position while the other arm is maintained in said first position so that said arms are oppositely angled relative to the elongated direction of the conveyor unit for maintaining the skid stationary even though the conveyor unit continues to cyclically reciprocate.

5. A conveyor system according to claim 4, wherein said reaction means includes a pair of said elongated rails disposed in parallel and sidewardly-spaced relation, each said rail having said upwardly-directed reaction surface thereon, and said arms being swingably mounted on said skid adjacent the opposite sides thereof so that each said arm respectively cooperates with a selected one of said reaction surfaces.

6. A conveyor system according to claim 5, wherein said rails project upwardly at least a limited extent above the uppermost surface of said conveyor rolls and define opposed inwardly-directed guide surfaces which are spaced apart by a distance which is slightly greater than the transverse width of the skid base for slidably guiding the side edges of the skid base during the advancing movement of the latter along the conveyor unit.

7. A conveyor system according to any one of claims 3–6, wherein said arm extends at an angle of between approximately 12° and approximately 30° relative to said perpendicular plane when in said first and second positions, with the lower end of said arm at its point of engagement with said reaction means being disposed on opposite sides of said perpendicular plane when in said first and second positions.

8. A conveyor system according to any one of claims 4–6, wherein said two arms are independently and individually swingable between said first and second positions for permitting one said arm to be maintained in said first position while enabling the other arm to be swingably moved into its second position so that said two arms are oppositely directed relative to the longitudinal direction of said conveyor unit for preventing movement of the skid in either direction even though the conveyor unit continues to cyclically reciprocate.

9. A conveyor system according to any one of claims 3–6, including a shroud fixed to said skid and positioned so as to extend around and partially enclose the lower end of said arm, said shroud being disposed so as to be positioned closely adjacent and at least partially extend over said reaction surface for preventing accidental access into the region of direct engagement between the lower end of the arm and the reaction surface.

10. A conveyor system according to any one of claims 3–6, wherein the pivot axis extends approximately horizontally, and wherein the arm is urged by gravity into a suspended position wherein the lower edge thereof is maintained in engagement with said reaction means.

11. A conveyor system according to any one of claims 1–3, wherein the mounting means permits the holding member to be selectively manually displaced relative to the skid between said first and second positions without requiring any disassembly of the holding means relative to the skid.

12. In a conveyor system, comprising in combination:
an elongated stationary structure, including a pair of horizontally elongated guide rails disposed in parallel but sidewardly-spaced relationship, said guide rails defining thereon a pair of inwardly-facing guide surfaces which are disposed opposite one another and are maintained a preselected distance apart;
a horizontally elongated conveyor unit positioned between said guide rails, said conveyor unit including a plurality of parallel spaced-apart freely-rotatable rolls which are individually rotatable about horizontal axes which extend substantially perpendicular to the elongated direction of said rails, and drive means connected to said conveyor unit for cyclically reciprocating the latter back and forth through a selected linear stroke which extends parallel with said elongated direction;
a skid structure including a base rollingly supported on said conveyor rolls for displacement along said conveyor unit in said elongated direction, the base of said skid structure having a width slightly less than said preselected distance so that said skid structure is slidably guided by and confined between said opposed guide surfaces;
one-way drive means coacting between said stationary structure and said skid structure for causing the skid structure to be intermittently unidirectionally moved in a steplike manner along said elongated direction in response to the cyclic reciprocation of said conveyor unit;
said one-way drive means including a pair of parallel but sidewardly spaced-apart elongated reaction surfaces fixedly associated with one of said structures, and a pair of sidewardly spaced-apart holding arms mounted on the other of said structures and disposed for reactive engagement with an adjacent one of said reaction surfaces, each said holding arm being swingably mounted on said other structure and being urged into a position wherein an edge of said arm is engaged with its respective reaction surface, each said arm being swingably mounted on said other structure for swingable displacement about a pivot axis which lies substantially within a plane which extends substantially perpendicular to said direction, said arm being swingably movable between first and second positions of engagement with its respective reaction surface, said arm when in said first position extending at an angle with respect to said perpendicular plane so that the edge of said arm engages the reaction surface at a location spaced on one side of said perpendicular plane for causing unidirectional movement of the skid structure only during the forward stroke of the conveyor unit movement, said arm when in said second position extending at an opposite angle relative to said perpendicular plane so that the edge thereof engages said reaction surface at a location spaced from and disposed on the opposite side of said perpendicular plane for causing oppositely-directed unidirectional movement of the skid structure only during the return stroke of the conveyor unit movement.

13. A conveyor system according to claim 12, wherein said two sidewardly-spaced arms are independently swingable between said first and second positions so that one arm can be angled on one side of said perpendicular plane and the other arm can be angled on the opposite side of said perpendicular plane so as to stationarily hold said skid structure even though the conveyor unit continues to cyclically reciprocate back and forth.

14. A conveyor system according to claim 12 or claim 13, wherein each said arm is independently manually swingable through an angle in excess of 180° but less than one complete revolution for movably displacing each said arm between said first and second positions.

15. A conveyor system according to claim 12 or claim 13, wherein said reaction surfaces are formed on said guide rails and are upwardly-directed, and said pair of holding arms are swingably mounted on said skid structure adjacent the opposite sides thereof for swinging movement about substantially aligned pivot axes which lie within said perpendicular plane and extend approximately horizontally, said pivot axes being positioned vertically upwardly a substantial distance above said reaction surfaces so that the individual arms are suspended downwardly due to the urging of gravity for maintaining the lower edge of each arm in engagement with the respective reaction surface, each said arm extending at an angle of between approximately 12° and approximately 30° relative to said perpendicular plane when in said first and second positions.

16. In a conveyor system, comprising in combination:
an elongated stationary structure including horizontally elongated guide rail means;
a horizontally elongated conveyor unit positioned adjacent and in parallel relationship with said guide rail means, said conveyor unit including a plurality of parallel spaced-apart freely-rotatable rolls which are individually rotatable about horizontal axes which extend substantially perpendicular to the elongated direction of said rail means, and drive means connected to said conveyor unit for cyclically reciprocating the latter back and forth through a selected linear stroke which extends parallel with said elongated direction;
a skid structure including a base rollingly supported on said conveyor rolls for displacment along said conveyor unit in said elongated direction, said skid being slidably guided by said guide rail means;
one-way drive means coacting between said stationary structure and said skid structure for causing the skid structure to be intermittently unidirectionally moved in a steplike manner along said elongated direction in response to the cyclic reciprocation of said conveyor unit;
said one-way drive means including an elongated reaction surface which extends in a direction substantially parallel with said guide rail means and is fixedly associated with one of said structures, and a holding arm mounted on the other of said structures and disposed for reactive engagement with said reaction surface, said holding arm being swingably mounted on said other structure and being urged into a position wherein an edge of said arm is engaged with said reaction surface, said arm being swingably mounted on said other structure for swingable displacement about a pivot axis which lies substantially within a plane which extends substantially perpendicular to the elongated direction of said reaction surface, said arm being swingably movable between first and second positions of engagement with said reaction surface, said arm when in said first position extending at an angle with respect to said perpendicular plane so that the edge of said arm engages said reaction surface at a location spaced on one side of said perpendicular plane for causing unidirectional movement of said skid structure only during the forward stroke of the conveyor unit movement, said arm when in said second position extending at an opposite angle relative to said perpendicular plane so that the edge thereof engages said reaction surface at a location spaced from and disposed on the opposite side of said perpendicular plane for causing oppositely-directed unidirectional movement of the skid structure only during the return stroke of the conveyor unit movement.

17. A conveyor system according to claim 1, wherein said reaction means defines thereon an elongated and substantially continuous reaction surface which is upwardly directed, said mounting means comprising pivot means mounted on said skid at a location disposed upwardly relative to said reaction surface, said pivot means defining a pivot axis which lies within a plane which extends substantially perpendicular with respect to the longitudinal direction of said conveyor, and said holding means comprising an elongated paddlelike arm which adjacent the upper end thereof is swingably supported on said pivot means so that the arm is suspended downwardly from the pivot means, said arm having a length as measured from its lower end to said pivot axis which is greater than the vertical spacing between said pivot axis and said reaction surface so that the lower end of said arm engages said reaction surface while maintaining said arm in angled relationship relative to and on one side of said perpendicular plane, whereby said arm when viewed from said pivot axis is angled in the upstream direction relative to the advancing direction of the skid, and said mounting means permitting the arm to be selectively displaced relative to the skid so as to cause the lower end of said arm to engage the reaction surface on the other side of said perpendicular plane for defining the aforementioned first and second positions.

* * * * *